UNITED STATES PATENT OFFICE.

EUGEN FRANK, OF ELBERFELD, PRUSSIA, GERMANY, ASSIGNOR TO THE FARBENFABRIKEN, VORMALS FR. BAYER & CO., OF SAME PLACE.

YELLOW DYE.

SPECIFICATION forming part of Letters Patent No. 401,024, dated April 9, 1889.

Application filed July 15, 1884. Serial No. 137,789. (Specimens.) Patented in Germany June 14, 1884, No. 31,658, and in England July 1, 1884, No. 9,606.

*To all whom it may concern:*

Be it known that I, EUGEN FRANK, residing at Elberfeld, in the Kingdom of Prussia and Empire of Germany, chemist, and assignor to the Farbenfabriken, vormals Fr. Bayer & Co., at Elberfeld, have invented a new and useful Improvement in the Manufacture of Dye-Stuffs or Coloring-Matters, (for which Letters Patent have been granted to me or to my assignees with my knowledge and consent in Germany, June 14, 1884, No. 31,658, and in England, July 1, 1884, No. 9,606,) of which invention the following is a specification.

My invention relates to the production of a new coloring-matter by the action of tetrazoditolyl upon salicylic acid.

In carrying out my process practically I proceed as follows: Ten (10) kilograms of tolidin sulphate finely comminuted are suspended in one hundred and fifty liters of water; twenty (20) kilograms of muriatic acid of 21° Baumé are added, and when this solution is cooled by ice forty-four kilos of sodium nitrite dissolved in water are gradually added. In this way a reddish-yellow solution of tetrazo-ditolyl chloride is formed. This solution is now allowed to flow slowly into a solution of a mixture of ten (10) kilograms of salicylic acid, forty (40) kilograms of soda hydrate, and two hundred and fifty liters of water. Under violent stirring a precipitate is formed which is with difficulty soluble in water. After having been allowed to rest for several hours the brown-yellow precipitate is filtered and dried.

The thus-obtained dye-stuff of the composition

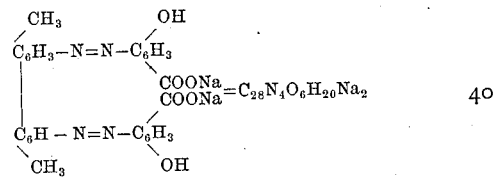

forms a brown-red amorphous powder which dissolves in hot water with difficulty, easily dissolved, however, in hot soap-water; but it is insoluble in cold water, giving a yellow color, which changes brown by adding alkali. With concentrated sulphuric acid the dye-stuff dissolves a dark violet color. It dyes cotton not mordanted in a hot soap bath a yellow color, being fast to scouring and sunlight, but a more reddish yellow than the homologous product of my Letters Patent No. 329,638 of benzidine.

What I claim as my invention, and desire to secure by Letters Patent, is—

The coloring-matter herein described, which is produced by the action of tetrazo-ditolyl upon salicylic acid, and which is a brown-red powder, forming a yellow solution when dissolved in hot soap-water, and which forms a brown coloring-matter with alkali and with concentrated sulphuric acid produces a dark violet color and dyes unmordanted cotton a yellow color fast to soap solution and sunlight, substantially as described.

EUGEN FRANK.

Witnesses:
GEO. H. EVANS,
WM. A. POLLOCK.